United States Patent [19]

Haines

[11] 4,364,627

[45] Dec. 21, 1982

[54] METHOD AND SYSTEM FOR CONSTRUCTING A COMPOSITE HOLOGRAM

[75] Inventor: Kenneth A. Haines, Santa Clara, Calif.

[73] Assignee: Eidetic Images, Inc., Elmsford, N.Y.

[21] Appl. No.: 73,181

[22] Filed: Sep. 7, 1979

[51] Int. Cl.³ .................. G03H 1/30; G03H 1/24; G03H 1/26
[52] U.S. Cl. .................................... 350/3.76; 350/3.83
[58] Field of Search .................. 350/3.65, 3.76–3.78

[56] References Cited

U.S. PATENT DOCUMENTS

| | | | |
|---|---|---|---|
| 3,625,584 | 12/1972 | St. John | 350/3.79 |
| 3,632,869 | 1/1972 | Bartolini | 350/3.79 |
| 3,716,286 | 2/1973 | St. John et al. | 350/3.65 |
| 3,915,551 | 10/1975 | Silverman et al. | 350/3.75 |
| 4,206,965 | 6/1980 | McGrew | 350/3.76 |
| 4,283,109 | 8/1981 | Huff et al. | 350/3.76 |

OTHER PUBLICATIONS

Leith, et al., "White Light Hologram Technique", *Applied Optics*, vol. 17, No. 20, Oct. 15, 1978, pp. 3187-3188.

*Primary Examiner*—Bruce Y. Arnold
*Attorney, Agent, or Firm*—Majestic, Gallagher, Parsons & Siebert

[57] ABSTRACT

Techniques for making individual narrow lenticular holograms for a composite drum shaped hologram wherein the vertical and horizontal aspects of an object beam and of an image therein are optically processed independently of each other. A very narrow lenticular hologram is made preferably having a width related to the horizontal resolution element size of the reconstructed image in order to minimize undesirable lines in the reconstructed image. The image is predistorted in the hologram construction step to account for a wavelength change if one exists between construction and reconstruction. A master drum hologram is constructed with ultraviolet light utilizing photoresist holographic detector material, in one specific embodiment.

31 Claims, 9 Drawing Figures

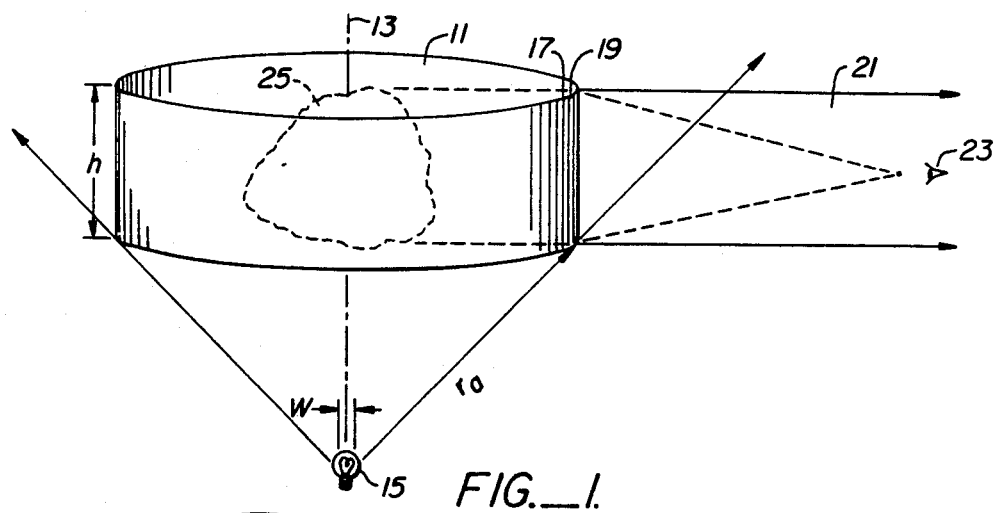
FIG.—1.
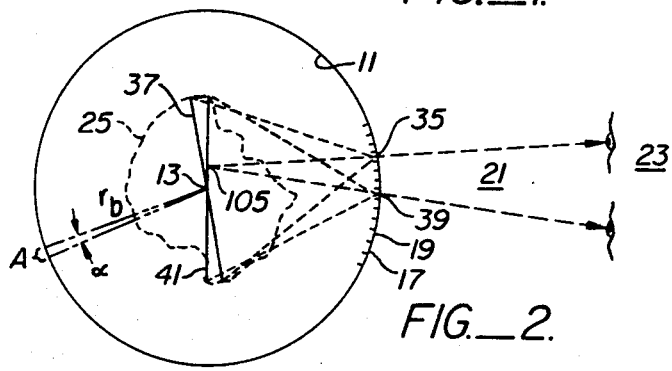
FIG.—2.
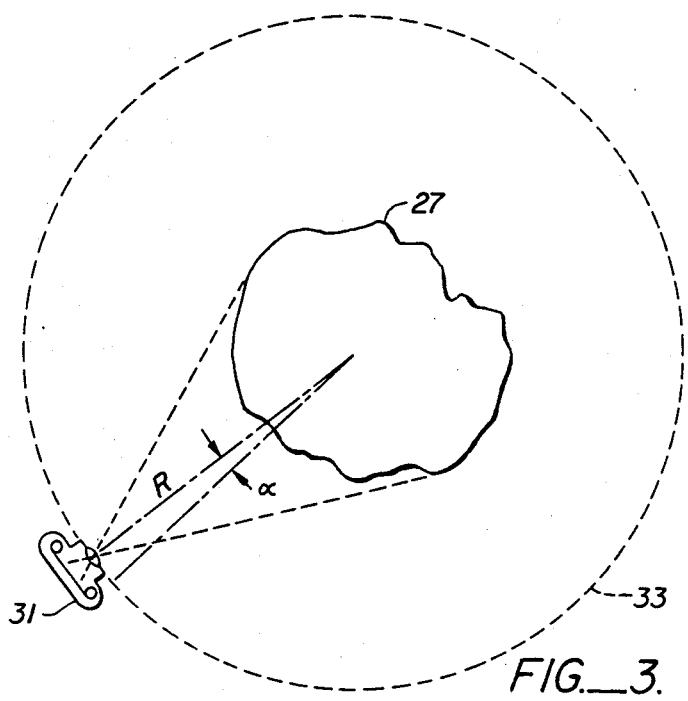
FIG.—3.

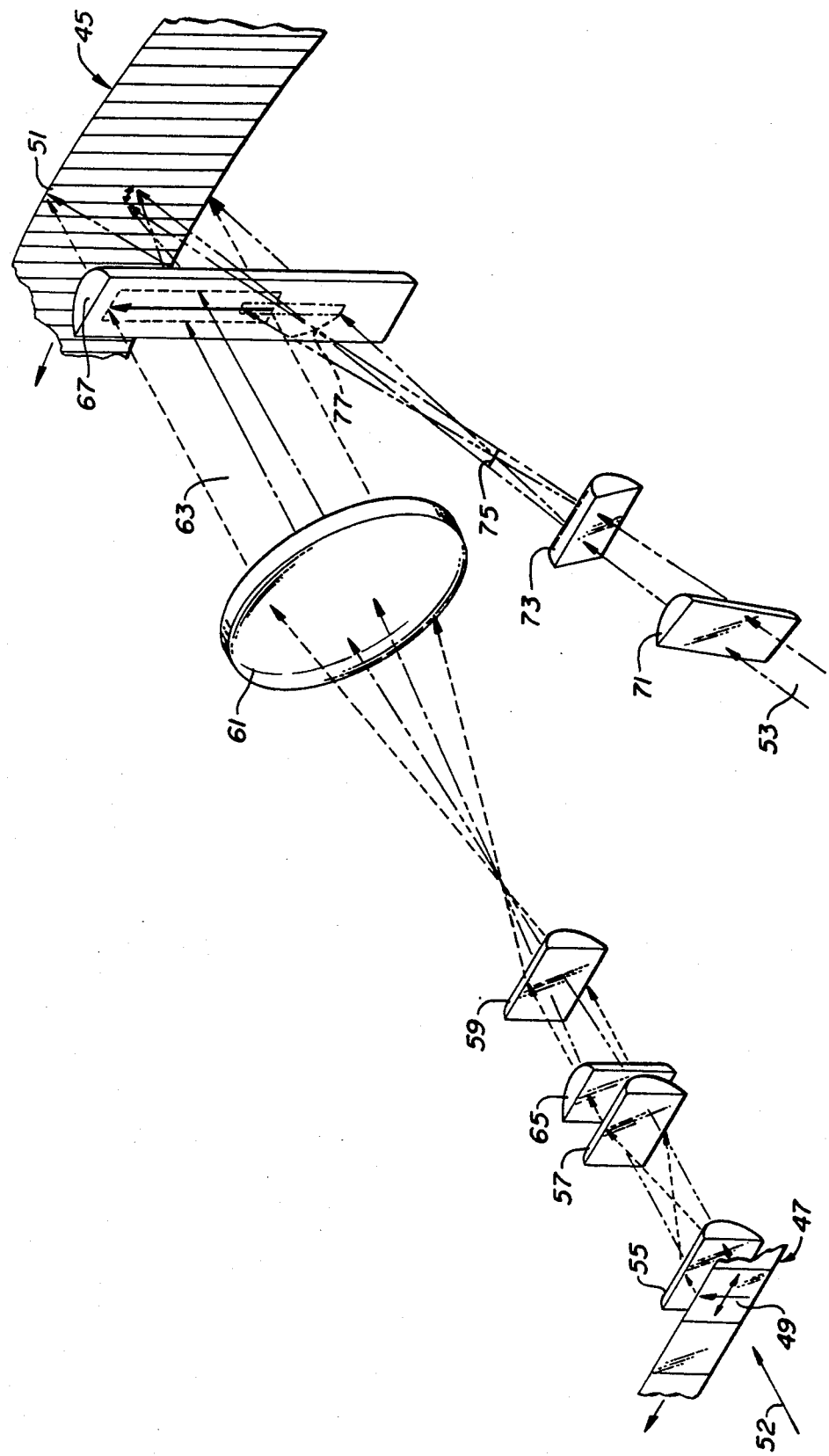
FIG._4.

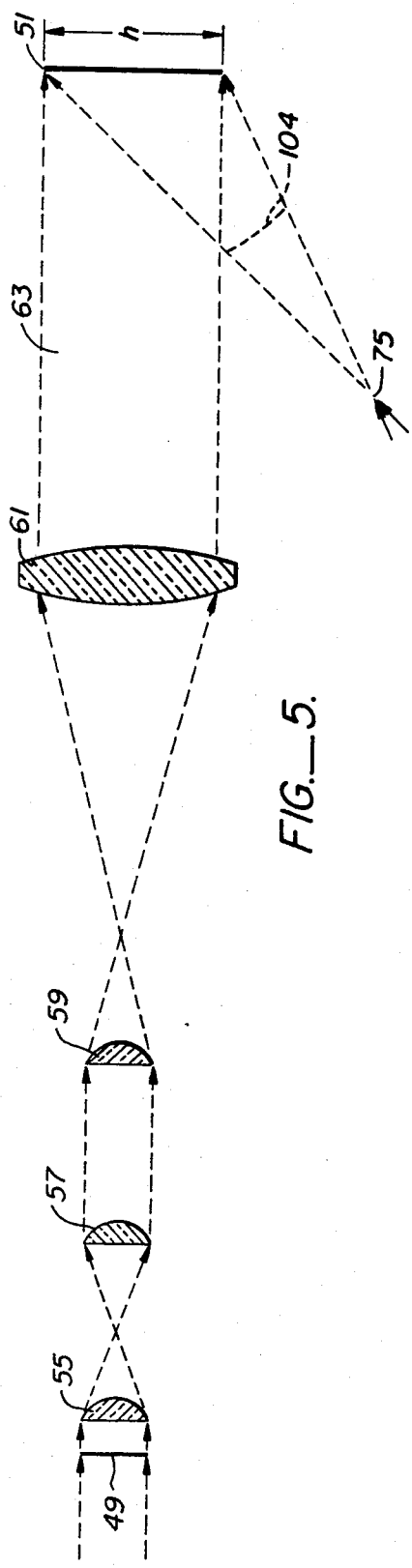
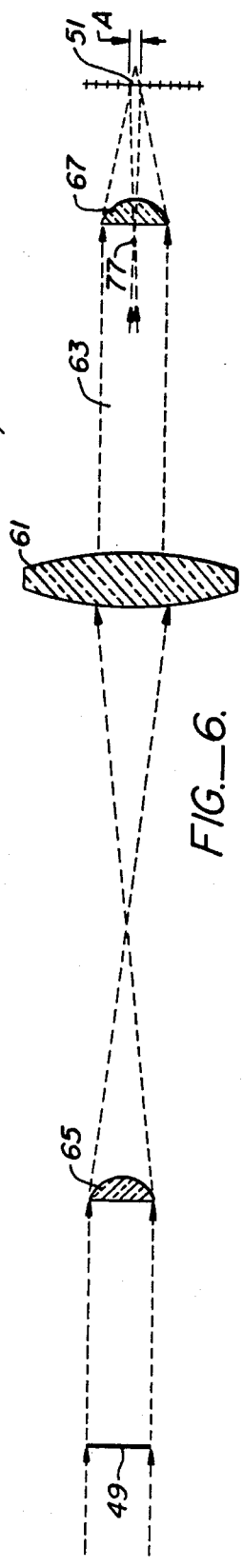
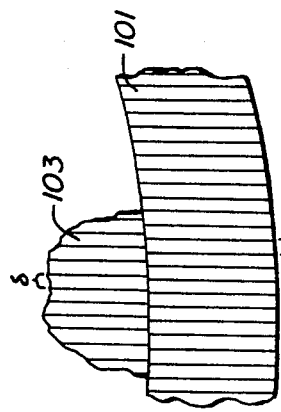
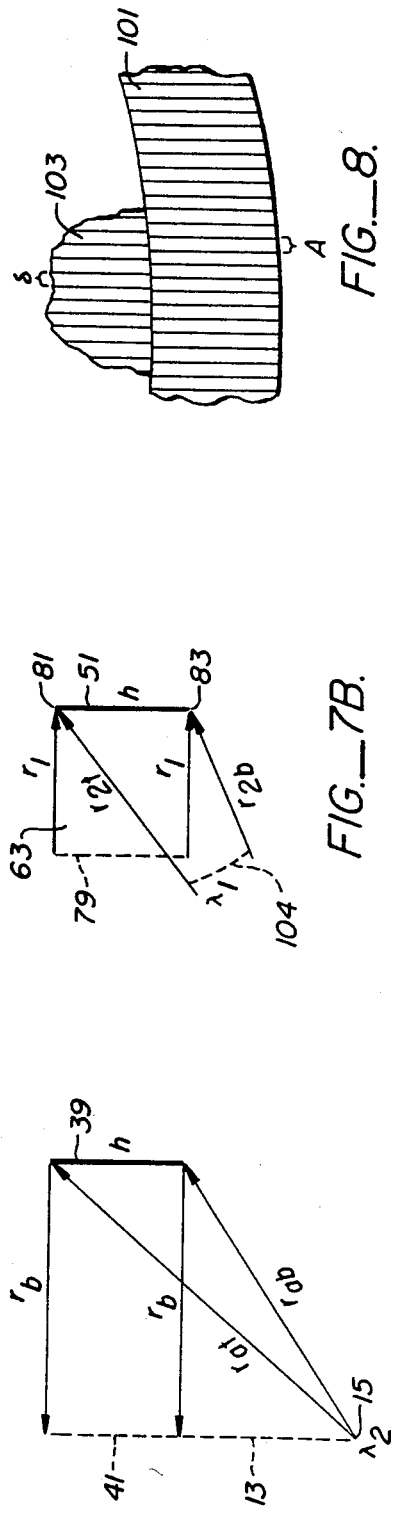
FIG._5.
FIG._6.
FIG._8.
FIG._7B.
FIG._7A.

METHOD AND SYSTEM FOR CONSTRUCTING A COMPOSITE HOLOGRAM

BACKGROUND OF THE INVENTION

This invention relates generally to the art of optical holography, and more particularly to composite holography, sometimes referred to as lenticular or multiplex holography.

Techniques for making and using drum shaped composite holograms were developed many years ago. A brief description of such holograms is given on page 95 of the October 1976 issue of *Scientific American* as part of an article by Emmett N. Leith entitled "White-Light Holograms" beginning at page 80. Briefly, a three-dimensional object is first photographed in an ordinary manner from all sides. Individual narrow lenticular holograms are then formed on a continuous holographic detector material that is subsequently formed into a drum. Each lenticular hologram is constructed from a single ordinary photograph transparency of the three-dimensional object that was earlier taken. Upon white light illumination of the hologram a three-dimensional image of the originally photographed object appears to the observer to exist in the middle of the hologram drum. The observer may walk around the drum and thus around the image of the object. If the object is moved during the photography of it, the resulting holographically reconstructed image will also shown that motion as the observer walks around the drum.

One system is presently being marketed and used by several businesses to make composite holograms. This system is referred to as the "Cross" system, named after its developer Lloyd Cross. This system for constructing the lenticular hologram first magnifies the transparency equally in all directions and forms an image a distance from the hologram detector equal to the radius of the resulting hologram drum. A very large cylindrical lens is placed in this image plane and focuses the light in the horizontal direction so that it fits into the small lenticular hologram aperture. The hologram is made with coherent visible light.

It is a principle object of the present invention to provide a technique and system for making a lenticular hologram capable of reconstructing a sharper and brighter image that fills more of the space within the center of the drum than do lenticular holograms made with existing techniques, and to eliminate vertical lines from the reconstructed image.

It is another object of this invention to provide a technique which allows for an undistorted visible image to be reconstructed from the drum hologram, even though the hologram is constructed with non-visible radiation.

It is a further object of the present invention to provide a technique for making a master lenticular hologram that is suitable for economical mass replication thereof.

SUMMARY OF THE INVENTION

These and additional objects of the present invention are accomplished, briefly, by a method wherein each lenticular hologram is made by separately processing the horizontal and vertical aspects of a coherent transparency image containing beam. Flexibility then exists for independently shaping and focusing the vertical and horizontal aspect of the object beam and the image information carried thereby.

The image carrying beam is made narrow and thereby results in the use of a much narrower cylindrical lens than can be used in other techniques for gathering the light in a horizontal direction into the narrow lenticular hologram. This results in a better quality hologram since small cylindrical lenses or reflectors are better controllable as to curvature and other qualities. Additionally, the narrow lens makes possible a very narrow lenticular hologram width that, according to another aspect of the invention, is related in width to the horizontal resolution element of the recorded image, thereby minimizing annoying vertical lines from the reconstructed image.

The resolution of the reconstructed image is also improved by focusing the vertical aspects of the transparency image (horizontal image lines) onto the hologram detector during the making of a hologram, while the horizontal aspects of the image (vertical image lines) are focused on a surface a distance removed from the detector surface. In combination, the reference beam may be given a different curvature in its vertical and horizontal directions so that each lenticular hologram reconstructs in the center of the drum a single clear image of the object transparency by means of a substantially point ordinary white light source.

By treating the horizontal and vertical aspects of the transparency image beam independently, the hologram may advantageously be constructed with a shorter wavelength of radiation than the white light reconstructing source without undesirable image distortions. This also contributes to the reconstructed image occupying more of the volume inside the holographic drum than existing techniques.

This has only briefly summarized the major aspects of the present invention. Other objects, advantages and aspects of the present invention will become apparent from the following detailed description which should be taken in conjunction with the accompanying drawings.

BRIEF DESCRIPTION OF THE DRAWINGS

FIG. 1 schematically illustrates in side view the reconstruction of an image from a drum shaped lenticular hologram;

FIG. 2 schematically illustrates in top view the hologram reconstruction of FIG. 1;

FIG. 3 shows the technique for making transparencies around a three dimensional object for holographic recording;

FIG. 4 illustrates a preferred way of making a lenticular hologram according to the present invention;

FIG. 5 illustrates the optics of the system of FIG. 4 from the side view, ignoring any optical components that do not operate on the vertical image aspects (horizontal image lines);

FIG. 6 illustrates a top view of the optical components of FIG. 4, ignoring any optical components that do not affect the horizontal aspects of the image (vertical image lines);

FIGS. 7A and 7B schematically illustrate the relationship between the construction and reconstruction vertical optical geometry of the system of FIGS. 4–6, FIG. 7B referring to construction and FIG. 7A to reconstruction; and FIG. 8 shows undesirable vertical image lines present in existing techniques but which are minimized by the techniques of the present invention.

DESCRIPTION OF THE PREFERRED EMBODIMENTS

Referring initially to FIG. 1, a composite hologram 11 in the shape of a cylindrical drum having a centerline 13 is illuminated by a small electric lightbulb 15 positioned on the centerline 13, or axis, of the hologram 11 at a distance below the hologram. This is the standard way of illuminating a composite hologram. The lightbulb 15 is of a standard incandescent type which emits radiation over a wide visible light bandwidth. Its filament width is made to be as small as possible and has a dimension "w" in a direction illuminating one or more holograms. The entire inside surface of the hologram 11 is illuminated at one time by the light emitted from the bulb 15.

The composite hologram 11 is made up of a large number of narrow lenticular holograms, such as adjacent hologram 17 and 19, completely around the drum. The composite hologram drum 11 has a height "h" and each of the lenticular holograms, such as 17 and 19, are that height. The narrow widths of the holograms adjoin or overlap one another around the drum hologram 11.

Light from the reconstructing light source bulb 15 is diffracted by the holograms, in a well-known manner, forming an image carrying beam 21 in which an observer 23 sees a virtual image 25 of an object. The image 25 is within the hologram drum 11. As the observer 23 either walks around the hologram drum 11 or as the hologram drum 11 is rotated relative to the observer 23, the observer sees all sides of a three-dimensional image 25.

The image 25 has its apparent three-dimensional quality because of the way it is made. With reference to FIG. 3, a three-dimensional solid reflective object 27 is photographed by a camera 31 in a normal way but in a circular path 33 around the object 27. It is the ordinary film transparencies obtained of the object 27 in this way which then become the subject or object of the individual lenticular holograms that are constructed with coherent light around the surface of the drum 11.

The radius of the circle 33 of FIG. 3 is "R" while the redius of the hologram 11, as shown in FIG. 2, is "$r_b$". As described more fully hereinafter as part of this invention, each of the lenticular holograms of the drum hologram 11 is preferably made from a transparency that views the object 27 from a unique direction. The width of each of the lenticular holograms of the composite hologram 11 is designated as "A" (FIG. 2) which extends an angular distance $\alpha$. Ideally, each of the photographs taken of the object 27 (FIG. 3) is taken at a position that is angularly displaced $\alpha$ radians from adjacent camera positions.

Referring to FIG. 2, the actual mechanism for reconstructing the apparent three-dimensional image 25 of the object 27 will be briefly explained. Since each of the lenticular holograms on the drum 11 is made from a separate slide, each lenticular hologram thereby reconstructs an image of its recorded transparency of the object 27. For example, a single lenticular hologram 35 reconstructs an image 37 of the transparency taken of the object 27 from one position. Similarly, a lenticular hologram 39 reconstructs an image 41 of a transparency taken of the object 27 from a slightly different angle. The observer 23 will observe two such reconstructed images of the area around a point 105 since his or her two eyes are looking through separate lenticular holograms. This gives a stereoscopic effect to the image which is thus observed as a three-dimensional image within the drum 11. As the observer moves around the drum 11, he or she always views two reconstructed object transparency images for each object point within the drum 11 and these images themselves change the angular view obtained of the object 27. The observer 23 thus thinks that he or she is walking around a full three-dimensional image of the object.

Referring to FIGS. 4, 5 and 6, a particular and specific implementation of the varius aspects of the present invention will be described. These figures show a configuration for time sequentially constructing the narrow elongated lenticular holograms adjacent one another on a holographic detector 45, each lenticular hologram being made of a different frame of a transparency strip 47 that was taken around the object to be recorded. For explanation of the system of FIGS. 4-6, a single transparency frame 49 is being recorded as one lenticular hologram 51. As is standard in holography, the transparency 49 is illuminated by a coherent radiation beam 51, generally derived from a laser, processed optically and thrown into the lenticular hologram aperture 51 where the transparency modified coherent radiation is interfered with a reference beam. The reference beam is formed from a coherent light beam 53 that is preferably derived from the same laser as the transparency illuminating beam 52. The reference beam 53 may also be optically processed prior to striking the hologram detector 51 for interference with the transparency modified radiation.

The horizontal and vertical aspects of the image of the transparency 49 are processed independently of one another in the embodiment of FIGS. 4-6. Referring initially to FIGS. 4 and 5, the optical elements operating on the vertical aspects of the object transparency image are explained. The "vertical aspects" of the object transparency beams refers to horizontal lines or horizontal components of the transparency image. These are affected by cylindrical lens 55, 57 and 59 which all have their axes of curvature oriented in a horizontal direction. These lenses as well as a large spherical lens 61 are positioned in the transparency modified coherent radiation in order to throw the vertical aspects (horizontal lines) of the image onto the hologram 51 with a transparency modified beam 63 that is collimated in the vertical direction and which carries the transparency image with a height equal to the long dimension of the lenticular hologram detector 51. Since the long dimension of the detector 51 will, in most applications, be larger than the vertical dimension of the object transparency 49, it can be seen that some magnification occurs in the vertical direction.

Referring to FIGS. 4 and 6, the optical elements operating on the horizontal aspects of the object transparency image are explained. The "horizontal aspects" of the image refers to vertical lines or components of the transparency image. A cylindrical lens 65 having a vertically extending center of curvature is positioned in the transparency modified beam and operates in conjunction with the spherical lens 61 on the horizontal image aspects. The beam 63 leaving the lens 61 is preferably collimated in the horizontal direction (as well as the vertical) and strikes a cylindrical lens 67 having an axis of curvature oriented vertically. The purpose of lens 67 is to gather light in the beam 63 into the much narrower width "A" of the lenticular hologram detector 51. The lens 67 also functions, together with lenses 61 and 65, to cast an image of transparency 49 into a surface which is appropriately selected, in a manner which is later described.

Cylindrical lenses are difficult to make optically perfect. The larger the cylindrical lens, the more difficult it is to achieve this optical quality. Since, as discussed hereinafter, it is preferable to make the width "A" of each individual lenticular hologram very small in the order of significantly less than one millimeter wide, the optical quality of the lens 67 must be very high. Therefore, only a narrow lens 67 can be used. That means that the width of the image information in the beam 63 must be controlled by the lenses 61 and 65 to be narrow as well. By separately processing the horizontal and vertical aspects of the transparency modified radiation beam, it is possible to make the beam 63 narrow in the horizontal direction while being much larger in the vertical direction.

This apparent distortion may at first seem detrimental to the final reconstructed image, since an observer placing a viewing card in the beam 63 would see a very elongated image of the transparency 49. That image would be very much out of proportion. But it turns out that the image reconstructed from the hologram can be totally undistorted if the vertical magnification is selected such that "h" is the appropriate size. In the absence of a wavelength change between construction and reconstruction (the subject of a later discussion), the ratio of the vertical to horizontal magnification between beams 52 and 63 ought to be approximately equal to the desired drum hologram radius $r_b$ divided by the focal length of the cylindrical lens 67. This will result in the reconstructed image 25 (FIGS. 1 and 2) having no distortion (different magnification) in its horizontal and vertical directions. This is independent of where the vertical and horizontal aspects of the transparency 49 image are focused during hologram construction. The construction image distortion is corrected upon reconstruction of the hologram image 25 without the cylindrical lens 67.

Besides different magnifications of the beam 63 in the horizontal and vertical directions, the horizontal and vertical aspects of the image of the transparency frame 49 can be brought to focus at different positions along the beam 63. It has been found that the vertical aspect of the transparency 49 image (the horizontal lines of the image) does not need to be focused in the center of the drum and that it is preferable that it be focused by the optics of FIG. 5 into the surface of the hologram detector 51. The result is a much sharper image because chromatic dispersion is eliminated. All image points which are not in the hologram plane suffer such chromatic dispersion, even though this dispersion is less for these "rainbow" holograms than for classical holograms. The sharpest horizontal line detail in the image is whatever happens to come to focus on the hologram surface, so we might just as well cause the image rather than its diffraction pattern to be focused on that surface. Because of this chromatic dispersion, with existing techniques, it is this diffraction pattern which is seen by the observer rather than a crisply focused image. The cylindrical lens 67 is a very important element and is placed as close to the hologram detector 51 as practical, thus reducing its width. A lens of an f-number of unity is about as powerful as can be obtained without degrading the quality of the resulting hologram too much. In any event, the horizontal aspect of the transparency image, as shown in FIGS. 4 and 6, is often focused in or very near the lens element 67 in order to minimize the effect on that image that any aberrations of the lens may have.

The horizontal aspect of the final reconstructed image (that is, the vertical line structure thereof) is focused into a surface which is dependent not only upon the position of the intermediate image created from the system of FIG. 6 and used as the object in the construction of the hologram 51, but also upon the position of the illumination source 15 in FIG. 1, and the construction reference 77 in FIG. 6. A relationship which is common to holography is:

$$\frac{1}{r_b} = -\frac{1}{r_a} - \frac{\lambda_2}{\lambda_1}\left(\frac{1}{r_1} - \frac{1}{r_2}\right) \qquad (1)$$

where $r_1$ is the construction image distance from hologram 51, $r_2$ is the construction source 77 distance from the hologram 51, as it appears after being modified by lens 67, $\lambda_2$ is the hologram reconstruction wavelength, which for our case is rather broad, and $\lambda_1$ is the laser construction wavelength. The selection of $r_b$ is actually a compromise which has been selected as the drum radius as in FIG. 2. The reason for this selection is as follows. Ideally, one would like to cause each vertical line in the reconstructed image to come to focus in the plane which contains that line. In other words, in FIG. 2, those portions of the image which appear to be close to the drum surface 11 ought to be focused by the elemental holograms into planes which are themselves close to the hologram surface, while portions of the image which are farther away ought to be focused into more distant planes. If this is not the case, then when one observes stereoscopic views of the image, he will see annoying diffraction patterns which overlay where he would normally see crisp images overlaid. Obviously this desired focus condition cannot be satisfied for all image points. As a compromise the plane which passes through the center of the drum, such as 37 or 41 in FIG. 2, is selected as that plane into which horizontal aspects (vertical image lines) of the image are focused in reconstruction.

Even though we have determined that the value of $r_b$ is the drum radius, the location of the image as created by lenses 65, 61, and 67 in FIG. 6, can still be arbitrarily selected, and equation 1 satisfied with an appropriate selection of reference point or line 77.

The reference beam 53 has an additional requirement in that for the vertical aspect, shown in FIG. 5, it must appear to the hologram to radiate from the source point 75, rather than the point 77. The position of point 75 is selected so that the image diffracted rays will emerge from the drum hologram as parallel rays for any single wavelength of the illumination source. In the absence of a wavelength change between hologram construction and illumination, this specifies that the position of 75 mimic the reconstruction source position (as 15 in FIG. 1). Therefore, the distance from 75 to 51 should be $r_a$ if there is no wavelength change. Variations of this rule allow the rays to converge to a point located at the viewers eye. Because the vertical and horizontal aspects of the reference beam focus are usually not at the same plane, the reference beam 53 is optically processed by the use of cylindrical lenses 71 and 73. The lens 73 is positioned to form a horizontal line focus 75 at the appropriate distance. The cylindrical lens 71, together with cylindrical lens 67, create a vertical line focus (77 modified by lens 67) at an effective position, as viewed from the hologram 51, that is in the vicinity of the focused horizontal aspect of the image, shown in FIG. 4 as a special case to be coincident with the cylindrical lens 67, and which satisfies equation (1).

Referring to FIGS. 7A and 7B, the various dimensions of the vertical elements can be better explained. In the example of FIG. 7A, (as shown in FIG. 2) it is desired to reconstruct an image 41 of the horizontal aspect of the transparency object image at a distance $r_b$ from the hologram 39. This will place the image 41 at the center of the drum cylindrical hologram 11. The hologram 39 is illuminated by the substantial point white light source 15 positioned substantially under the center of the drum hologram, as well. In order for that to occur, certain basic relationships between dimensions must exist with the way that the hologram is made and which satisfy equation (1) above. Referring to FIG. 7B, the hologram detector 51 is located a distance $r_1$ from an image 79 that is the horizontal aspect (vertical image lines) of the object transparency that is formed by the lenses 65, 61 and 67 of the optical system of FIGS. 4 and 6. A vertical line focus 104 (actually the image of 77 as created by the lens 67) in the reference beam is constructed at a location and with a particular shape so that the image 41 of FIG. 7A will be constructed where it is desired when reilluminated with a desired reconstruction source.

Since there are no elements that significantly diffuse the light in the construction optics of FIGS. 4–6, an extreme upper point 81 of the hologram detector 51 will receive interferring coherent light from only the upper portion of the object beam 63 and the reference beam from the line focus 104. Similarly, with each point along the height of the detector 51, rays of a different location in the reference beam and of the object beam 63 will interfere to form the portion of the hologram at that point on the detector. At the other extreme of the detector 51 is a point 83 which receives the lower most rays of the reference beam from the bottom of the line focus 104 and the bottom rays of the object beam 63. For each point along the hologram 51, for a hologram of optimum quality, the basic known optical relationship needs to be met which is like equation (1), but is restated here for the top point 81 of FIG. 7B:

$$\frac{1}{r_b} = -\frac{1}{r_{at}} - \frac{\lambda_2}{\lambda_1}\left(\frac{1}{r_1} - \frac{1}{r_{2t}}\right) \quad (2)$$

The various distances and radii are identified in FIGS. 7A and 7B.

Similarly, for the lower most point 83 of the hologram aperture 51, the following relationship needs to be satisfied:

$$\frac{1}{r_b} = -\frac{1}{r_{ab}} - \frac{\lambda_2}{\lambda_1}\left(\frac{1}{r_1} - \frac{1}{r_{2b}}\right) \quad (3)$$

A similar relationship needs to be satisfied for each point along the vertical line focus 104 and these equations can be solved for the radial distance of each point along the line 104 from the hologram aperture 51. This defines a preferred optimal position of the line 104 in order to reconstruct an undistorted image in the vertical direction of the object in the manner shown in FIG. 7A at the center of the drum. One method of approximating the ideal line 104 is to tilt the cylindrical lens 71 about a horizontal axis such that it causes beam 53 to be tilted to satisfy the calculations of equations 2 and 3.

Another advantage of processing the horizontal and vertical aspects of the image separately, as explained with respect to FIGS. 4–6, is that there is complete freedom to construct the hologram with a different wavelength than that to be used in its reconstruction. There is a distinct advantage, in fact, of constructing the hologram with radiation in the near visible region at the ultraviolet end of the visible spectrum and then reconstructing it with white light in the visible region. The result of the wavelength change is to magnify the image in the horizontal direction upon reconstruction and this results in filling more of the drum 11 with the apparent three-dimensional image. However, no magnification is experienced in the vertical direction. So the image must be pre-distorted before construction of hologram 51. For example, the width of the beam 63 may be artificially compressed by the ratio $\lambda_2/\lambda_1$. The independent processing of the horizontal and vertical aspects of the transparency image upon hologram construction has the advantage of enabling different magnifications in the vertical and horizontal directions as required by this wavelength change.

It will be noted that since the lens 67 of FIGS. 4–6 is so close to the hologram detector 51 that there is no room to bring the reference beam on to the hologram detector 51 without passing through the lens 67. This is why line 77 is not shown to be identical to line 104. Line 104 results from the imaging of line 77 by the lens 67. With certain detector materials, it is suitable to direct the reference beam onto the hologram detector 51 from a side opposite to that illuminated by the object beam 63. This would then allow the reference beam to avoid having to pass through the cylindrical lens 67.

It should also be noted that in place of lens elements, reflective optical elements can be utilized, and this is particularly appropriate for the very sensitive lens 67 where the higher quality possible with reflective elements can be utilized very effectively. A higher f-number cylindrical element of satisfactory quality can be particularly advantageously employed in place of the cylindrical lens 67.

The individual lenticular holograms are formed with their widths adjacent to each other with no gaps between them and preferably no overlap. But since the widths are so small, it is difficult to position the holograms so precisely. Therefore, in practice, a small overlap is made to assure that no gaps are formed, one hologram made to overlap an adjacent one for less than fifty percent of its width. Such a limited overlap does not unduly attenuate the brightness of the reconstructed image.

Any standard holographic detector may be utilized in practising the invention described principally with respect to FIGS. 4–6. Ordinary silver halide photographic film is the most popular. But it has been found that a photoresist material is particularly suitable where an ultraviolet region coherent light source (or sometimes a deep blue which is close to the ultraviolet region) is utilized to construct the hologram since photoresist is quite sensitive to that wavelength of radiation. Furthermore, photo-resist is a surface relief type of material; that is, after exposure and processing, the holographic information is not contained in it by intensity variations but rather is contained with surface variations that cause refraction of reconstructing light according to the information recorded on the hologram. The surface variations of the photo-resist have the further advantage of being able to serve as a master hologram for economically producing multiple copies of the hologram. To do this, a nickel master is preferably made from the photo-resist master. The nickel master is then used to stamp out duplicate holograms on inexpensive plastic by an embossing process. The various techniques of the present invention result in a high quality master hologram that reconstructs a bright image with better sharpness in image detail than heretofore possible. Such a master is thus suitable for such mass replication wherein the image intensity and sharpness is necessarily degraded in making the copies.

Referring to FIG. 8, a problem with existing composite holography techniques is illustrated. A portion of a drum composite hologram 101 is shown having a large number of elongated lenticular holograms joined together around the drum at the widths of the lenticular holograms. Each lenticular hologram, for convenience, is made the elongated rectangular shape and has a width "A", but, of course, the basic technique and those employing the various aspects of the present invention can be utilized with lenticular holograms of non-uniform widths and of some other shape. But in the usual case shown in FIG. 8, the lines adjoining each of the lenticular holograms are visible to the observer and this superimposes an undesirable optical "noise" in the form of these lines over the image information that is desired to be viewed. Since the optics used in constructing the hologram 101 according to the present invention, as previously described, allow the making of very narrow holograms, with the dimension "A" significantly less than one millimeter if desired, the line structure can be made so fine that the observer could not see it while standing a certain distance from the hologram. That is, the lines can be made so close together that the human eye cannot resolve them from the distance away that the hologram is designed to be viewed.

Dramatically reducing the dimension "A" has an undesirable side effect on an image 103 that is reconstructed from the hologram 101 with a white light source as previously described. The size of the smallest resolvable point of the image 103 in the horizontal direction, typically denoted by the symbol "$\delta$", increases as the lenticular hologram width "A" decreases, according to the following standard relationship of optics:

$$\delta \approx \frac{\lambda_2 r_b}{A} \tag{4}$$

Therefore, as "A" goes down, "$\delta$" goes up and the result is a blurring of the image 103 in the horizontal direction. In addition, the reconstruction of a number of two-dimensional images in the middle of the hologram 101 to form the apparent three-dimensional image 103 causes an interference between the images to produce a line structure on the image 103 itself. The lines are spaced "$\delta$" apart. So in addition to the image blurring, the reduction of the lenticular hologram width on the composite hologram 101 increases the spacing of the undesirable lines superimposed on the image 103. Therefore, it does no good to make the hologram spacing so close as to eliminate the lines in the hologram when they are, as a result, made more visible and predominant on the image 103.

There are many ways that one might attack the problem of minimizing the effect of these lines to the hologram observer. One way is to make the lenticular holograms irregular in shape so that the lines would not be as visible as they are in the typical hologram where they are regularly spaced. Another possibility is to use a wide reconstruction source, such as the source 15 of FIG. 1, which will blur the hologram lines but this also blurs the image undesirably. According to the present invention, the effect of these lines is minimized by creating an image in which an image point width (i.e., "$\delta$") is overlayed by hologram lines of an equal size. Using equation (4) above, the following optimum relationship exists:

$$A = \sqrt{\frac{\lambda_2 r_b D}{r_b + D}} \approx \sqrt{\lambda_2 r_b} \tag{5}$$

where D, the distance between observer and hologram, is usually quite large with respect to $r_b$. This, therefore, defines the hologram width that is selected when the optics are put together in a manner illustrated in FIGS. 4, 5 and 6 hereinabove.

The reason that the condition of equation (5) minimizes the effect of these lines can be understood by visualizing the viewing of such a hologram and image by an observer who gradually moves back away from the hologram. Assuming initially that the observer sees both the lines of the hologram 101 and of the image 103, there will be some distance from the hologram as the observer gradually moves back that each set of these lines independently disappears as they no longer become resolvable by the observer's eye. What the condition of equation (5) does is to make those lines disappear at the same distance back from the hologram 101. If the spacing "A" were made to be so narrow that the lines on the hologram 101 disappeared for the observer at a much closer distance to the hologram, then the lines of the image 103 would be visible to the observer as he moved back a much further distance than the suggested optimum of where the lines both disappear at the same point to the observer. This occurs because of the relationship between the undesirable lines.

The relationship of equation (5) assumes a point source while in fact the source 15 will have a size "w" that is finite, such as 0.5 or 1.0 millimeter. As is well known, the size of the source limits the smallest resolvable element of the image, thus defining the smallest "$\delta$" that is possible for the image. The undesirable lines on the image 103 can thus be spaced apart up to $\delta \approx w$ before the lines are even visible at any distance from the hologram.

Therefore, for finite reconstruction white light sources, the optimum value of "A" is given by the following expression:

$$\frac{\lambda_2 r_b}{w} \leq A \leq \sqrt{\lambda_2 r_b} \tag{6}$$

This says that the lenticular hologram width "A" can never be greater than the conditions set forth in equation (5), but can be made less than that defined by equation (5) if the reconstruction source is so large that it's going to blur the image and wipe out the undesirable lines anyway for widths "A" equal to or greater than the minimum width defined by the left hand side of equation (6). The left hand side of equation (6) is a restatement of the basic known condition of equation (4) wherein the image resolution "δ" is made equal to the source size "w".

The optimal lenticular hologram width "A" as described above contemplates the individual holograms being constructed immediately adjacent one another without any overlap. Overlapping of the holograms by too great an amount has an undesirable effect of reducing the amount of intensity of the reconstructed image. Furthermore, it prohibits the use of a new perspective (i.e., transparency) for every hologram, which has been stated as being desirable. In practice it is often best to overlap the adjacent holograms by a small amount such that the spacing between adjacent holograms is greater than one-half the hologram width. (Less than a 50% overlap of any two adjacent holograms) This is done because the edges of the hologram are not well defined, but are functionally smooth; a determination of what is meant by edge, in that case is somewhat difficult. By overlapping the holograms slightly, one effectively smooths out the composite image and makes the presence of adjacent holograms less noticeable. In any event, when these holograms are overlapped, the foregoing discussion is meant to be interpreted such that the dimension "A" is actually the distance by which the hologram is advanced between exposures of adjacent elements. In that case, "A" is in effect the hologram element spacing.

At the same time that the dimensioned "A" is optimized according to the foregoing discussion, it is further optimum to make each individual lenticular hologram from a transparency of the three-dimensional object that views that object from a unique position, as previously described with respect to FIGS. 2 and 3. This maximizes the resolution of the reconstructed image and makes the apparent motion of the object image as smooth as possible as the observer moves around the hologram. Any attempt to increase the number of perspective views by decreasing "A" is futile since a decrease in "A" so degrades the image that the image changes caused by the additional views can no longer be perceived.

The principles of the present invention have been described for implementation with electromagnetic radiation in the visible or near-visible region of the spectrum. The techniques of this invention, however, also may be implemented by other types of radiation, such as ultrasonic, x-ray or microwave radiation.

A flat hologram may be created by simply flattening out a portion of a drum. In another method, the collection of the original photographic views is slightly altered to create a relatively undistorted image within a flat. All of the methods and techniques herein are applicable to these flat holograms.

Although the various aspects of the present invention have been described with respect to its preferred embodiments, it will be understood that the invention is entitled to protection within the full scope of the appended claims.

I claim:

1. In a method of making a lenticular hologram composed of narrow elongated hologram elements positioned along a horizontal line with their long dimensions vertical, each of said elements recording an image of an object, an improved method of constructing an individual hologram element thereof, comprising the steps of:
   obtaining a coherent radiation object beam that contains information of the object,
   optically processing the vertical and horizontal aspects of said object beam such that vertical and horizontal aspects of the image come to focus at substantially different, finite surfaces,
   directing said object beam onto a narrow elongated hologram detector, and
   simultaneously directing onto said detector at a finite angle to the object beam a reference beam of radiation that is coherent with said object beam.

2. The method according to claim 1 wherein the step of optically processing the object beam additionally includes: positioning, in the object beam near to the hologram detector, a narrow elongated cylindrical optical element that is oriented with its narrow dimension across the horizontal extent of the processed object beam, said optical element gathering the object beam into the narrow dimension of the hologram detector without affecting the vertical extent of the processed object beam; and collimating said object beam in both the vertical and horizontal directions before it is incident on said cylindrical optical element.

3. The method according to claim 1 wherein the step of optically processing said object beam includes focusing the vertical aspects of the image (horizontally extending lines thereof) onto a surface that is substantially coincident with said hologram detector and focusing the horizontal aspects of the image (vertically extending lines thereof) into a surface displaced a significant distance from said hologram detector.

4. The method according to claim 3 wherein the step of optically processing said object beam additionally includes: positioning a cylindrical optical element near the detector in the path of the object beam, and focusing the horizontal aspects of the object image onto a surface substantially coincident with said cylindrical optical element.

5. The method according to claim 3 wherein the step of directing a reference beam onto the hologram detector includes controlling the horizontal curvature of the reference beam so as to have an apparent center of curvature at a vertically extending line, this line being positioned along the reference beam a distance toward the detector from a horizontally extending line which is the center of curvature of the vertical curvature of the reference beam.

6. The method according to claim 1 wherein the step of directing the reference beam onto the detector includes independently controlling the horizontal and vertical curvature of the reference beam so as to have the center of its horizontal curvature at a vertically extending line and the center of its vertical curvature at a horizontally extending line, these lines being displaced along the reference beam a finite distance from the detector and each other.

7. A lenticular hologram made according to the method of any of the claims 1, 2, 3, 4, 6 or 5.

8. The method according to any of the claims 1, 2, 3, 4, 6 or 5 wherein the width of each of said hologram elements is less than one millimeter.

9. The method according to any of the claims 1, 2, 3, 4, 6 or 5 wherein the distance between the centers of said hologram elements is selected to be substantially equal to the horizontal resolution element size of an image reconstructed therefrom.

10. The method according to any of the claims 1, 2, 3, 4, 6 or 5 wherein the distance between the centers of said hologram elements is selected to be greater than one-half the hologram element width.

11. The method according to either of claims 6 or 5 wherein the reference beam vertically extending line shape and position are selected so as to cause the horizontal aspects of the image, (i.e., the vertically extending lines thereof) reconstructed from the lenticular hologram to come to focus in the vertical plane which is located at the same horizontal distance from the hologram as is the reconstruction illumination source when the lenticular hologram is viewed.

12. In a method of making a lenticular hologram composed of individual, vertically-elonogated, hologram elements positioned along a horizontal line with their long dimensions vertical and extending around a drum surface of a given radius, each of said elements recording an image of a two-dimensional transparency of a three-dimensional object for reconstruction in white light of an incoherent image of the transparency, an improved method of constructing an individual hologram element thereof, comprising the steps of:
   illuminating the object transparency with coherent radiation to form a transparency modified beam,
   positioning optical elements in the transparency modified beam to control the width of the beam and to focus vertical lines of the transparency image onto a first surface,
   positioning optical elements in the transparency modified beam to control the height of the beam and to focus the horizontal lines of the transparency image onto a second surface, said first and second surfaces separated in space a finite distance,
   positioning a narrow-width, elongated, hologram detector in the path of said transparency modified beam after said optical elements,
   positioning a cylindrical optical element in the transparency modified beam near the hologram detector to concentrate the horizontal extent of the transparency modified beam onto said detector, the width of said cylindrical optical element being substantially less than the width of the reconstructed object transparency image, and
   directing onto said narrow-width, elongated, hologram detector at a finite vertical angle to the transparency modified beam, a reference beam of radiation that is coherent with said transparency modified beam.

13. The method according to claim 12 wherein said first surface is located a distance from the hologram detector that is significantly less than said given drum radius.

14. The method according to claim 13 wherein said second surface is located substantially coincident with said hologram detector.

15. The method according to claim 13 wherein the step of directing a reference beam onto the hologram detector includes controlling the horizontal curvature of the reference beam before it is incident onto the hologram detector surface by forming an actual or apparent, substantially vertical, line focus at a distance from the hologram detector that is significantly less than the given radius of the drum surface.

16. The method according to claim 12 wherein said first surface is positioned substantially coincident with said cylindrical optical element.

17. The method according to claim 12 wherein said second surface is located substantially coincident with said hologram detector.

18. The method according to claim 12 wherein the width of the lenticular hologram elements is selected to be substantially equal to the horizontal resolution element size of an image reconstructed therefrom.

19. The method according to claim 18 wherein each lenticular hologram element is made from a transparency having a unique angular view of the three-dimensional object recorded thereon.

20. The method according to claim 12 wherein the distance between the centers of the hologram elements is selected to be substantially equal to the horizontal resolution element size of an image reconstructed therefrom.

21. The method according to claim 12 wherein the step of directing a reference beam includes positioning optical elements therein that independently control the horizontal and vertical curvature of the reference beam as it strikes the hologram detector.

22. The method according to claim 21 wherein the step of directing a reference beam includes positioning optical elements therein that independently control the horizontal and vertical curvature of the reference beam as it strikes the hologram detector, the optical elements which control the horizontal curvature are selected so that the reference wave will have an apparent center of curvature at a vertically extending line, the shape and position of this line being selected so as to cause the horizontal aspects of the image (i.e., vertically extending lines thereof) reconstructed from said lenticular hologram to appear to have been focused in the center of said drum.

23. The method according to any of claims 12 through 15 wherein said coherent radiation is within a near visible region of the electromagnetic energy spectrum at the ultraviolet side thereof.

24. In a method of making a lenticular hologram composed of individual, vertically-elongated, hologram elements positioned along a horizontal line with their long dimensions vertical and extending around a drum surface of a given radius, each of said elements recording an image of a two-dimensional transparency of a three-dimensional object for reconstruction in white light of an incoherent image of the transparency, an improved method of exposing an individual narrow, elongated hologram element detector, comprising the steps of:
   illuminating the object transparency with coherent radiation to form a transparency modified radiation beam,
   positioning optical elements in the transparency modified beam to control the width of the information carrying the beam and to focus horizontal lines of the transparency image substantially onto the hologram detector,
   positioning optical elements in the transparency modified beam to make the height of the information carrying beam substantially equal to the height of the hologram detector, and to focus the vertical lines of the transparency image into a surface in space a given finite distance from said detector, said optical elements forming a substantially collimated beam,
   positioning a narrow but high cylindrical optical element in the collimated, transparency-modified, beam to concentrate the horizontal extent of the transparency modified beam onto the narrow elongated hologram aperture, and directing onto said narrow hologram detector area at a finite vertical angle to the transparency modified beam, a reference beam of radiation that is coherent with said object transparency illuminating beam of radiation, said reference beam shaped (a) to have a horizontal curvature at the hologram detector that has an actual or apparent, substantially vertical, line focus located a distance from the hologram detector, and (b) to have a vertical curvature at the hologram detector that has an actual or apparent horizontal line focus a distance that is removed from the hologram detector along the reference beam and that is different from the vertical line focus distance.

25. In a method of making a lenticular hologram composed of narrow, elongated, hologram elements positioned along a horizontal line with their long dimensions vertical, each of said elements recording an image of an object, an improved method of constructing an individual hologram element thereof, comprising the steps of:

obtaining a coherent radiation object beam that contains information of the object, independently optically processing the vertical and horizontal aspects of said object beam and directing said object beam onto a narrow, elongated hologram detector, and simultaneously directing onto said detector at a finite angle to the object beam a reference beam of radiation that is coherent with said object beam, said reference beam having a curvature as it strikes the hologram detector that is independently controlled in the vertical and horizontal directions so as to have a center of horizontal curvature at a vertically extending line and a center of vertical curvature at a horizontally extending line, these lines being displaced along the reference beam a finite distance from the detector and from each other.

26. The method according to either of claims 6 or 25 including positioning in both the object beam and reference beam, adjacent the detector, a single elongated cylindrical lens with its length oriented parallel to the length of the hologram detector.

27. In a method of making a lenticular hologram composed of narrow, elongated hologram elements positioned along a horizontal line with their long dimensions vertical, each of said elements recording an image of an object, an improved method of constructing each hologram element thereof, comprising the steps of:

obtaining a coherent radiation object beam that contains information of the object, independently optically processing the vertical and horizontal aspects of said object beam and directing said object beam toward a narrow elongated hologram detector, simultaneously directing toward said detector at a finite angle with the object beam a reference beam of radiation that is coherent with said object beam, said reference beam having a curvature as it strikes the hologram detector that is independently controlled in the vertical and horizontal directions, and positioning in the path of both the object beam and reference beam at a location adjacent said detector an elongated, cylindrical lens with its length oriented parallel to the length of the hologram detector.

28. In a method of making a lenticular hologram composed of narrow elongated hologram elements positioned along a horizontal line with their long dimensions vertical, each of said elements recording an image of an object, an improved method of constructing an individual hologram element thereof, comprising the steps of:

obtaining a coherent radiation object beam that contains information of the object, selecting a narrow, elongated, hologram detector having a width substantially equal to a horizontal resolution element size of an image reconstructed therefrom, independently optically processing the vertical and horizontal aspects of said object beam and directing said object beam onto said detector, and simultaneously directing onto said detector at a finite angle to the object beam a reference beam of radiation that is coherent with said object beam, said reference beam having a curvature as it strikes the hologram detector that is independently controlled in the vertical and horizontal directions.

29. In a method of making a lenticular hologram composed of narrow, elongated, hologram elements positioned along a horizontal line with their long dimensions vertical, each of said elements recording an image of an object, an improved method of constructing an individual hologram element thereof, comprising the steps of:

obtaining a coherent radiation object beam that contains information of the object;

independently optically processing the vertical and horizontal aspects of said object beam and directing said object beam onto a narrow, elongated hologram detector through a cylindrical optical element positioned near said detector by:

focusing the vertical aspects of the image (i.e., the horizontally extending lines thereof) onto a surface that is substantially coincident with said detector, and focusing the horizontal aspects of the image (i.e., the vertically extending lines thereof) onto a surface that is substantially coincident with said cylindrical optical element, and simultaneously directing onto said detector at a finite angle to the object beam a reference beam of radiation that is coherent with said object beam, said reference beam having a curvature as it strikes the hologram detector that is independently controlled in the vertical and horizontal directions.

30. The method according to any of claims 1, 2, 3, 4, 6, 25, 27, 28, or 29, wherein the steps of obtaining an object beam, optically processing said object beam, and directing said object beam to the detector are all accomplished without significantly diffusing the object beam.

31. The method according to any of claims 1, 12, 24 or 29 wherein each of the recited steps is accomplished without significantly diffusing the object or reference beams.

* * * * *